July 28, 1953  H. F. HEISLER  2,646,691
GEAR ASSEMBLY
Filed Feb. 24, 1951
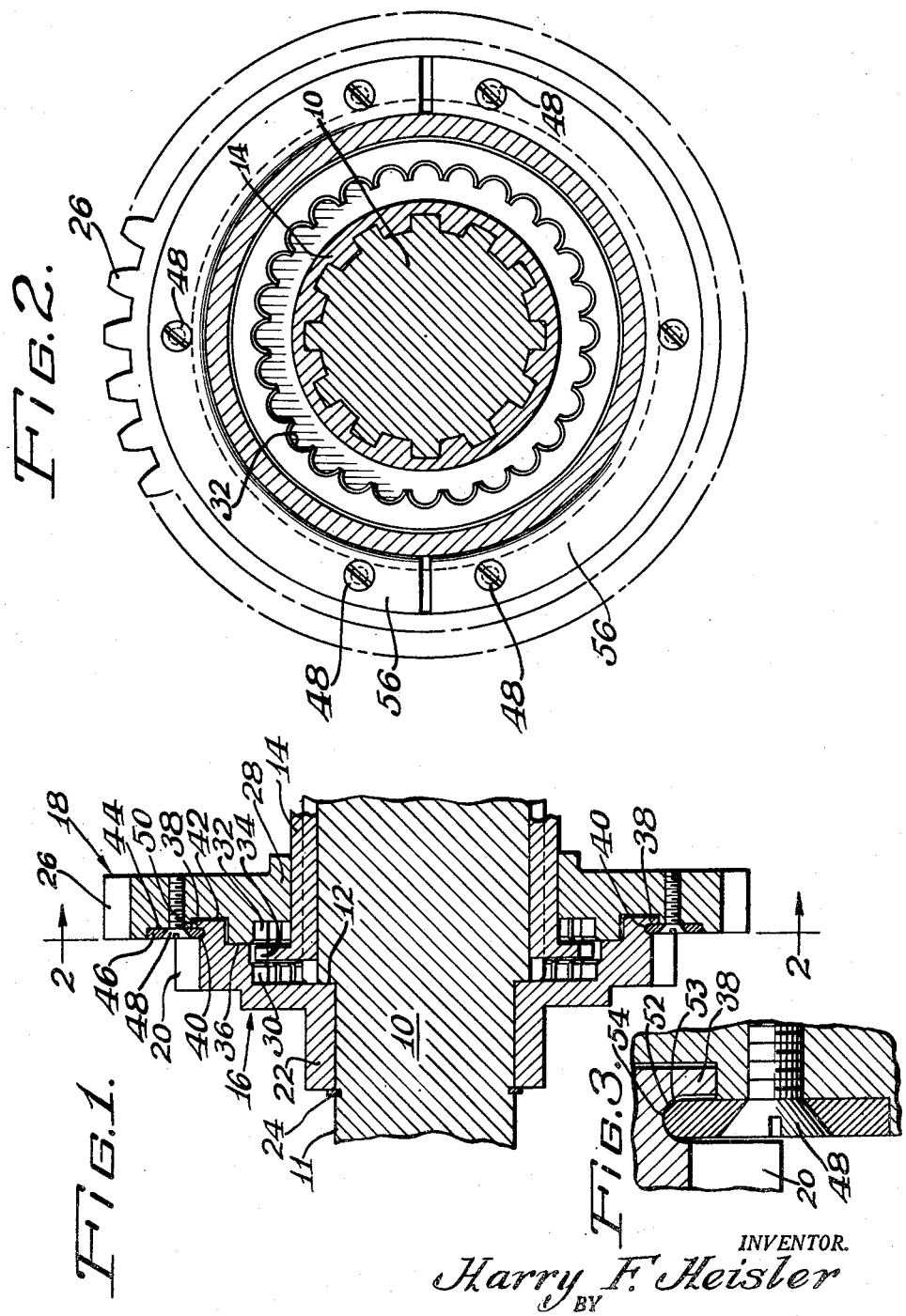
INVENTOR.
Harry F. Heisler
BY
Bair, Freeman & Molinare
Attys.

Patented July 28, 1953

2,646,691

UNITED STATES PATENT OFFICE 2,646,691

GEAR ASSEMBLY

Harry F. Heisler, Hudson, Iowa

Application February 24, 1951, Serial No. 212,651

3 Claims. (Cl. 74—333)

This invention relates to a gear assembly wherein a pair of gears are secured to each other in a manner to restrict axial motion therebetween and to permit relative rotation therebetween.

In automotive transmission systems, and other systems wherein gears are used, there are many occasions to have a pair of gears rotatably mounted on the same shaft, which gears must be fixed in position on the shaft so as to restrict axial motion therebetween and which gears must be rotatable relative to each other. One system is described in my co-pending application on an Overdrive System, Serial No. 208,175, filed January 27, 1951.

As shown in said co-pending application, the usual method of restricting axial motion of the gears relative to each other is by using spacers or snap rings which cooperate with portions of the countershaft or other gears on the countershaft. These spacers or snap rings usually are positioned on both sides of the gear assembly. It would be very desirable to reduce the number of spacers and snap rings necessary to restrict axial movement of the gear assembly.

Thus, one of the objects of this invention is to provide a gear assembly wherein a pair of gears are secured to each other in a manner to restrict axial motion therebetween and to permit relative rotation therebetween.

Another object of this invention is to provide a gear assembly wherein a pair of gears are secured to each other in a novel manner to permit relative rotation therebetween.

A further object of this invention is to provide a means for joining a pair of gears together whereby axial motion therebetween is restricted while relative rotation therebetween is unaffected, which means permit of ease in assembly and disassembly of the pair of gears.

Still another object of this invention is to provide a gear assembly wherein a pair of gears are secured to each other in a novel manner to permit relative rotation therebetween, and wherein the rubbing surfaces between the gears are kept as small as possible to reduce friction.

Further objects and advantages of this invention will become apparent as the following description proceeds and the features of novelty which characterize this invention will be pointed out with particularity in the claims annexed to and forming part of this specification.

Figure 1 is a cross-section view through the center of a gear assembly mounted on a shaft.

Figure 2 is a view taken on line 2—2 of Figure 1.

Figure 3 is a greatly enlarged view of the interlocking lips.

Referring now to the drawings, there is shown in Figure 1 a gear assembly mounted on a shaft 10 stepped to form a shoulder 12 therein. A shiftable sleeve 14 is splined to shaft 10. The reduced portion of the shaft 11 is machined to permit rotatable mounting of one of the gears thereon. It will be seen that the gear assembly described herein is applicable for use as the pair of rotatable gears mounted on the countershaft in my above referred to co-pending application.

The gear assembly consists of a first gear generally indicated at 16 and a second gear generally indicated at 18. The first gear has a gear edge 20 and a hub portion. The innermost portion 22 of the hub portion is bored for a rotatable fit on the reduced portion 11 of shaft 10. The portion 22 of the hub of gear 16 engages the shoulder 12 of shaft 10 to prevent axial movement of gear 16 toward the right. As shown in Figure 1, a snap ring 24, positioned in countershaft 10, is adapted to engage the left end of hub 22 to prevent axial movement of gear 16 toward the left.

The second gear 18 has a gear edge 26 and a hub portion. The innermost portion 28 of the hub portion of gear 18 is bored to provide for rotatable mounting of the gear 18 on the shiftable sleeve 14.

Gears 16 and 18 are provided respectively with internal dental elements 30 and 32 adapted to be selectively engaged by the toothed flange 34 on shiftable collar 14 for a purpose that is described in my above referred to co-pending application. The hub portions of the gears 16 and 18 have a bearing interface 36 therebetween.

A lip 38 is formed integral with the hub portion of gear 16 and is spaced from the major portion of the hub of gear 16. This lip and hub spaced from each other bound a first groove 40 which opens radially outward. The hub portion of gear 18 is provided with a recess 42 adapted to receive the first lip 38 on first gear 16. A portion of the hub of gear 18 is recessed at 44 and provides a washer mounting face. A washer or lip 46 is mounted on said washer mounting face 44 by means of screws 48. The inner or extended end of washer or lip 46 is spaced from the main body portion of the hub of gear 18 and bounds a second groove 50 which is open radially inwardly and adapted to receive the lip 38 on the first gear.

The size of the recess 42 in second gear 18 is such that when the gears 16 and 18 abut at interface 36, the lip portion 38 of first gear 16, although positioned within recess 42 of second gear 18, is not forced into engagement with any portion of the hub of gear 18, whereby frictional engagement therebetween is reduced.

The innermost surface or contour of first groove 40 is curved as indicated at 52 in Figure 3 and has a selected radius of curvature. The inner edge of lip 46 also has a selected radius of curvature as indicated at 53. The radius of curvature of the inner edge of lip 46 is less than the radius of curvature of the innermost contour 52 of groove 40. When the lip 46 is positioned in groove 40, it engages the innermost surface of groove 40 over substantially a single line of contact as indicated at 54. This reduces the frictional engagement between the lip 46 and the circumferential groove 40.

The lip 46 although shown secured to second gear 18 by means of screws 48, may be secured by any well known means of attachment. By using screws, the lip 46 is easily removed and provides for simple assembly and disassembly. The lip 46 consists of a plurality of arcuate annular strips, each subtending an arc of less than 180°. It is desirable that the arcs subtended by the segment of lip 46 be somewhat less than 180° so that binding of parts, during assembly, may be avoided. As shown specifically in Figure 2, the arcuate annular strips 56, which comprise lip 46, are substantially semi-circular but each subtends an arc of a little less than 180°.

In the assembly of the gears, the second lip 46 is detached from second gear 18. The gears are positioned in the final position as shown in Figure 1 with the second lip 46 removed. Then, the segments of the lip 46 are slipped into position and are secured to gear 18 by means of screws 48. The completed assembly provides a pair of gears which are rotatable with respect to each other but which may not be separated axially.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A gear assembly comprising a pair of gears, a lip on each gear spaced from a portion of the hub of the associate gear and bounding a pair of circumferential grooves, the lip on each gear being positioned in the circumferential groove formed in the other gear, whereby said lips interengage to prevent said gears being moved apart axially, the innermost surface of one of said circumferential grooves having a radius of curvature, and the extended end of the lip within said circumferential groove having a radius of curvature less than said radius of curvature of said circumferential groove, whereby said lip engages said innermost surface of the circumferential groove over substantially a single line of contact.

2. A gear assembly comprising a pair of gears, a lip on each gear, the lip on one gear being spaced from the hub thereof, said hub and lip bounding a first circumferential groove adapted to receive the lip on the second gear, said first groove being open radially outward, said lip on the second gear being spaced from a portion of the hub thereof and bounding therebetween a second circumferential groove, said second groove being open radially inwardly and adapted to receive the lip on the first gear, the innermost surface of said first circumferential groove having a radius of curvature, the innermost edge of the lip on said second gear having a radius of curvature less than said radius of curvature of said circumferential groove, whereby said lip on the second gear engages the first circumferential groove over substantially a single line of contact.

3. A gear assembly comprising a pair of gears, a lip on each gear spaced from a portion of the hub of the associate gear and bounding a pair of circumferential grooves, the lip on each gear being positioned in the circumferential groove formed in the other gear, whereby said lips interengage to prevent said gears being moved apart axially, the innermost surface of one of said circumferential grooves having a radius of curvature, the extended end of the lip within said circumferential groove having a radius of curvature less than said radius of curvature of said circumferential groove, whereby said lip engages said innermost surface of the circumferential groove over substantially a single line of contact, said lip being separable from its associate gear, and said lip comprising a plurality of annular strips each subtending an arc of less than 180°.

HARRY F. HEISLER.

References Cited in the file of this patent

UNITED STATES PATENTS

| Number | Name | Date |
| --- | --- | --- |
| 1,731,151 | Royce | Oct. 8, 1929 |
| 1,799,077 | Atha | Mar. 31, 1931 |
| 2,457,942 | Van Zandt | Jan. 4, 1949 |